(12) United States Patent
Gao et al.

(10) Patent No.: US 11,947,449 B2
(45) Date of Patent: Apr. 2, 2024

(54) MIGRATION BETWEEN SOFTWARE PRODUCTS

(71) Applicant: INTERNATIONAL BUSINESS MACHINES CORPORATION, Armonk, NY (US)

(72) Inventors: Lei Gao, Xi'an (CN); Jin Wang, Xi'an (CN); A Peng Zhang, Xi'an (CN); Kai Li, Xi'an (CN); Jun Wang, Xi'an (CN); Jing James Xu, Xi'an (CN); Rui Wang, Xi'an (CN); Xin Feng Zhu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/811,198

(22) Filed: Jul. 7, 2022

(65) Prior Publication Data
US 2024/0012746 A1    Jan. 11, 2024

(51) Int. Cl.
*G06F 9/44*    (2018.01)
*G06F 11/36*    (2006.01)

(52) U.S. Cl.
CPC ...... *G06F 11/3692* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 8,745,588 B2 * | 6/2014 | Kawashima | ........ | G06F 11/3692 717/124 |
| 9,600,264 B2 * | 3/2017 | Draper | ....................... | G06F 8/65 |
| 10,956,916 B1 | 3/2021 | Abreu | | |
| 11,200,049 B2 * | 12/2021 | Whalen | ............... | G06F 11/3688 |

(Continued)

FOREIGN PATENT DOCUMENTS

CN    1734421 A    2/2006

OTHER PUBLICATIONS

Bachwani, et al., "Mojave: A Recommendation System for Software Upgrades," Workshop on Managing Systems Automatically and Dynamically [conference], Oct. 2012, 7 pages, Retrieved from the Internet: <URL: https://www.researchgate.net/publication/234128761_Mojave_A_Recommendation_System_for_Software_Upgrades>.

(Continued)

Primary Examiner — Qamrun Nahar
(74) Attorney, Agent, or Firm — Daniel J Blabolil

(57) ABSTRACT

Embodiments of the present disclosure relate to a method, system and computer program product for semantic search based on a graph database. In some embodiments, a method is disclosed. According to the method, the user jobs of a user are obtained from a first software product. Based on the user jobs, target test cases are selected from a plurality of test cases associated with the first software product and a second software product. The target test cases are applied to the first software product and the second software product, and in accordance with a determination that a result of applying the target test cases satisfies a predetermined criterion, an instruction is provided to indicate migrating from the first (Continued)

software product to the second software product. In other embodiments, a system and a computer program product are disclosed.

20 Claims, 9 Drawing Sheets

(56) References Cited

U.S. PATENT DOCUMENTS

| | | |
|---|---|---|
| 2013/0290944 A1 | 10/2013 | Menon |
| 2014/0325480 A1* | 10/2014 | Bhagavatula ....... G06F 11/3688 717/124 |
| 2015/0067647 A1* | 3/2015 | Bakowski ............. G06F 11/368 717/124 |
| 2018/0129596 A1* | 5/2018 | Anaya ................. G06F 11/3692 |
| 2018/0253372 A1* | 9/2018 | Colaiacomo ........ G06F 11/3688 |
| 2021/0035021 A1 | 2/2021 | Sasson |
| 2021/0081837 A1 | 3/2021 | Polleri |
| 2021/0081848 A1 | 3/2021 | Polleri |

OTHER PUBLICATIONS

Mell, et al., "The NIST Definition of Cloud Computing", National Institute of Standards and Technology, Special Publication 800-145, Sep. 2011, 7 pages.

Olchówka, "Migrating Users to a New Product," Platform Updates [online], Jan. 23, 2014 [accessed on Sep. 9, 2021], 20 pages, Retrieved from the Internet: <URL: https://developers.livechat.com/updates/migrate-users-new-product>.

Sutton, "Product Migration: Convincing customers to change behavior with a 7-part email campaign," MarketingSherpa [case study], Apr. 26, 2011 [accessed on Sep. 9, 2021], 6 pages, Retrieved from the Internet: <URL: https://www.marketingsherpa.com/article/case-study/convincing-customers-to-change-behavior>.

Gao, et al., "Version Management for Machine Learning Pipeline Building", Application and Drawings, filed Dec. 1, 2022, 30 pages, Related U.S. Appl. No. 18/060,794.

IBM: List of IBM Patents or Patent Applications Treated as Related (Appendix P), dated Jan. 10, 2024 2 pages.

* cited by examiner

800

| STEP | FROM | TO | EDIT |
|---|---|---|---|
| 1 | [2,4,3,1,6,8,9,11] | [2,5,3,1,6,8,9,11] | SUBSTITUTION — 811 |
| 2 | [2,5,3,1,6,8,9,11] | [2,5,3,7,6,8,9,11] | SUBSTITUTION — 812 |
| 3 | [2,5,3,7,6,8,9,11] | [2,5,3,7,6,8,4,11] | SUBSTITUTION — 813 |
| 4 | [2,5,3,7,6,8,4,11] | [2,5,3,7,6,8,4] | DELETION — 814 |

| OPERATION | INPUT | OUTPUT |
|---|---|---|
| 1 | {A,B,C} | {C,D,E,F} |
| 2 | {A,B,C,D,E} | {D,E,H} |

FIG. 9

MIGRATION BETWEEN SOFTWARE PRODUCTS

BACKGROUND

The present disclosure relates to computer science, and more specifically, to a method, system, and computer program product for migration between software products.

Users often migrate from a software product to another software product (i.e., target software product) and expect to obtain better performance and user experience. The target software product may be a higher version of the software product being currently used or may be a software product integrated with features of several current software products. However, prior to migrating to the target software product, it is difficult for the users to check whether the target software product actually has the features they need because the target software product may be complex, and its features may not be well documented. Thus, great efforts are needed for the users to determine whether they can migrate to the target software product, and this may cause inconvenience to the users.

SUMMARY

According to one embodiment of the present disclosure, there is provided a computer-implemented method. According to the method, one or more processors obtain user jobs of a user from a first software product. One or more of the processors select, based on the user jobs, target test cases from a plurality of test cases associated with the first software product and a second software product. One or more of the processors apply the target test cases to the first software product and the second software product. In accordance with the determination that a result of applying the target test cases satisfies a predetermined criterion, one or more of the processors provide an instruction to migrate from the first software product to the second software product.

According to another embodiment of the present disclosure, there is provided a system. The system comprises a processing unit and a memory coupled to the processing unit. The memory stores instructions that, when executed by the processing unit, perform actions comprising: obtaining user jobs of a user from a first software product; selecting, based on the user jobs, target test cases from a plurality of test cases associated with the first software product and a second software product; applying the target test cases to the first software product and the second software product; and in accordance with a determination that a result of applying the target test cases satisfies a predetermined criterion, providing an instruction to migrate from the first software product to the second software product.

According to yet another embodiment of the present disclosure, there is provided a computer program product. The computer program product is tangibly stored on a non-transient machine-readable medium and comprises machine-executable instructions. The machine-executable instructions, when executed on a device, cause the device to perform actions comprising: obtaining user jobs of a user from a first software product; selecting, based on the user jobs, target test cases from a plurality of test cases associated with the first software product and a second software product; applying the target test cases to the first software product and the second software product; and in accordance with a determination that a result of applying the target test cases satisfies a predetermined criterion, providing an instruction to migrate from the first software product to the second software product.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 8 depicts an example of a number of single-step edits according to embodiments of the present disclosure.

FIG. 9 depicts an example of input and output of operations according to embodiments of the present disclosure.

Throughout the drawings, the same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Figure 1:
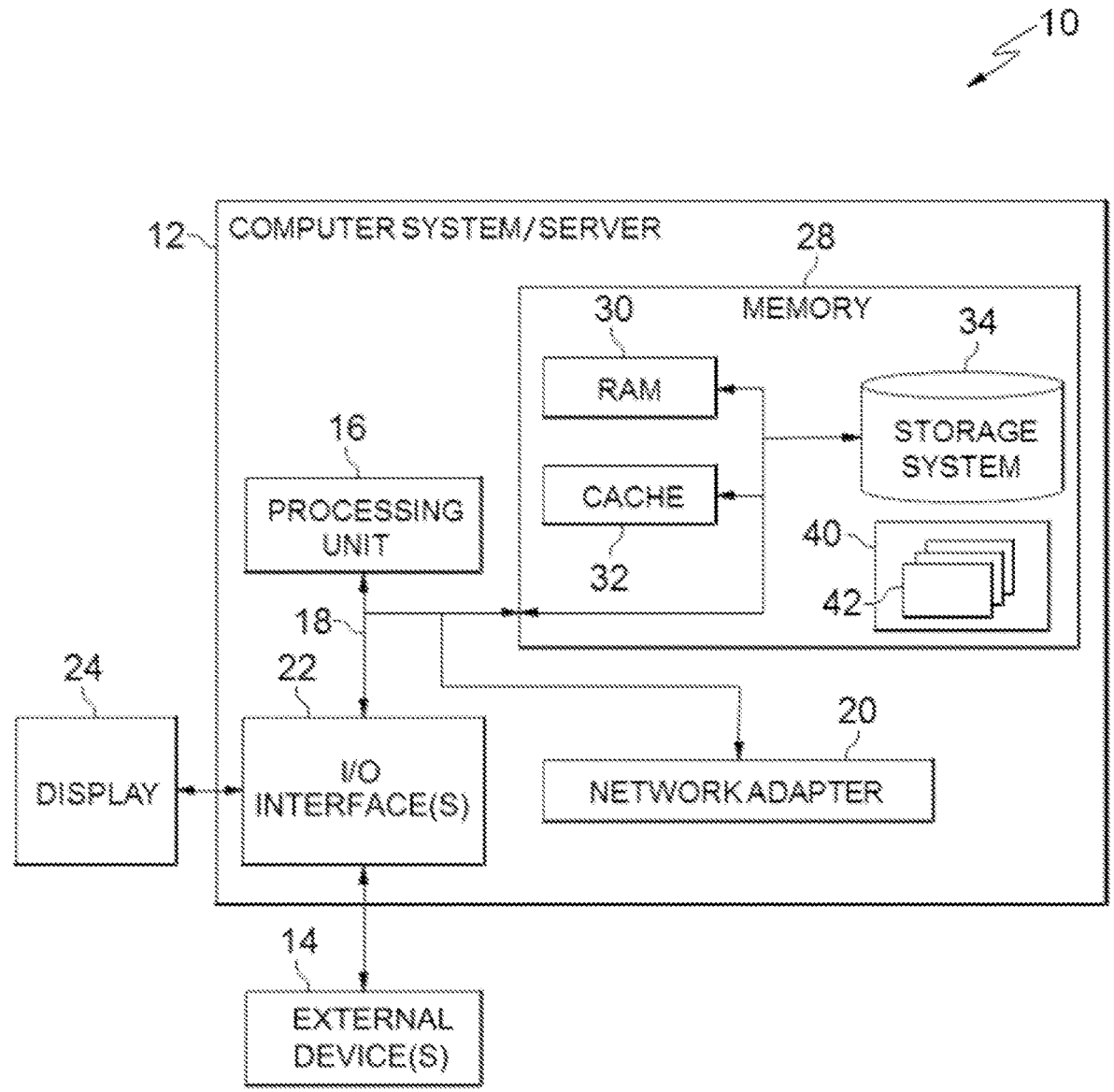
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to one or more processors or processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set, at least one, of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still, yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. Although not shown, it should be understood that other hardware and/or software components may be used in conjunction with the computer system/server 12. Examples include but are not limited to: microcode, device drivers, redundant processing units, external disk drive arrays, RAID systems, tape drives, data archival storage systems, etc.

Figure 2:
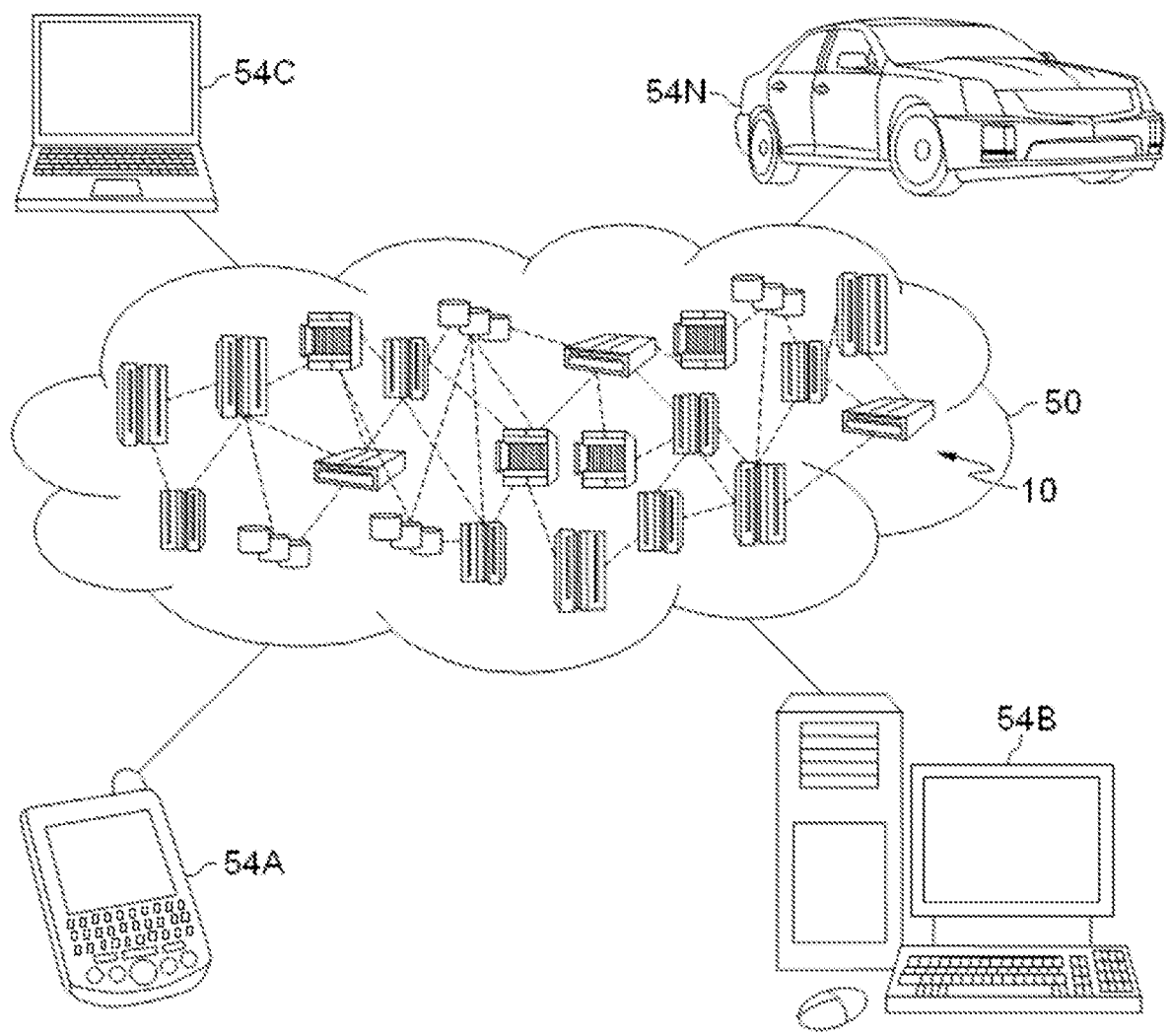
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
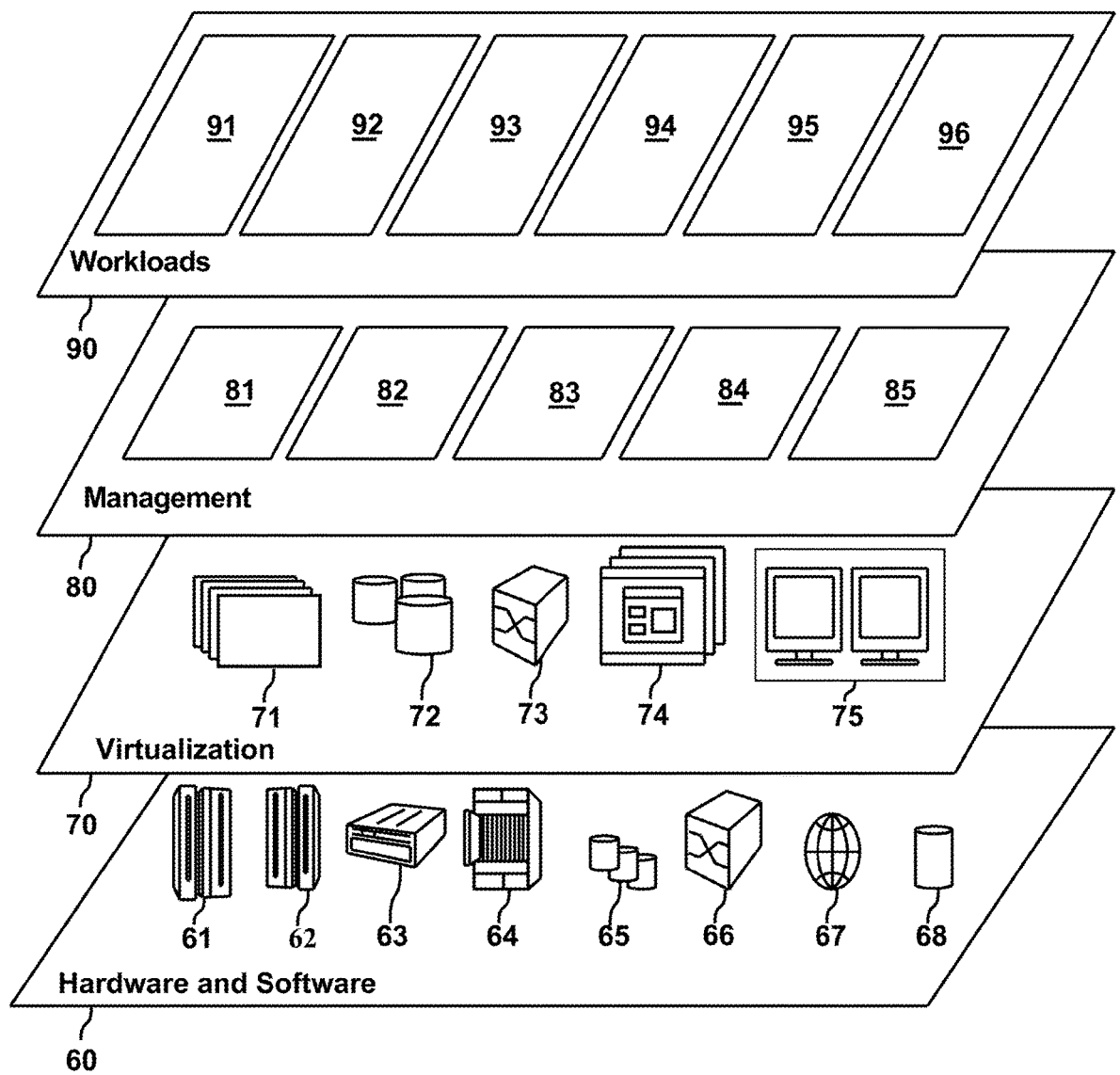
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software product migration recommendation 96. Hereinafter, reference will be made to FIGS. 4-9 to describe details of the software product migration recommendation 96.

As described above, the users may need to spend a lot of time reading documents of the target software product to find out whether the target software product provides the features they need, and sometimes the documents are unavailable. Thus, it is difficult for the users to decide whether they should migrate to the target software product.

A few solutions are proposed to provide the users with recommendations about the migration between software products. For example, usage data of some users interacting with the target software product may be obtained and used for predicting whether the other users should migrate to the target software product. However, in this solution usage data of "existing users" is needed and the prediction based on the "existing users" may be inappropriate for the other users.

In order to at least partially solve the above and other potential problems, embodiments of the present disclosure provide a solution for providing instruction about migration between the software products. According to the solution, the user jobs of a user are obtained from a first software product. Based on the user jobs, target test cases are selected from a plurality of test cases associated with the first software product and a second software product. The target test cases are applied to the first software product and the second software product, and in accordance with a determination that a result of applying the target test cases satisfies a predetermined criterion, an instruction is provided to indicate migrating from the first software product to the second software product.

As such, by applying the target test cases associated with the user jobs of the user to the first software product and the second software product, a user-specific feature gap between the first software product and the second software product can be determined. In other words, by using the user jobs of the user, the user can be instructed based on his/her usage behavior and thus the accuracy of recommendation can be improved.

For example, the user may be instructed to migrate to the target software product when the target software product has the features that the user often used in the current software product, regardless of whether the target software product has all of the features provided in the current software product.

Moreover, with the result of applying the target test cases, the user can be instructed with high confidence, and it is much easier for the user to understand the difference between software products than reading documents about the software products.

Figure 4:
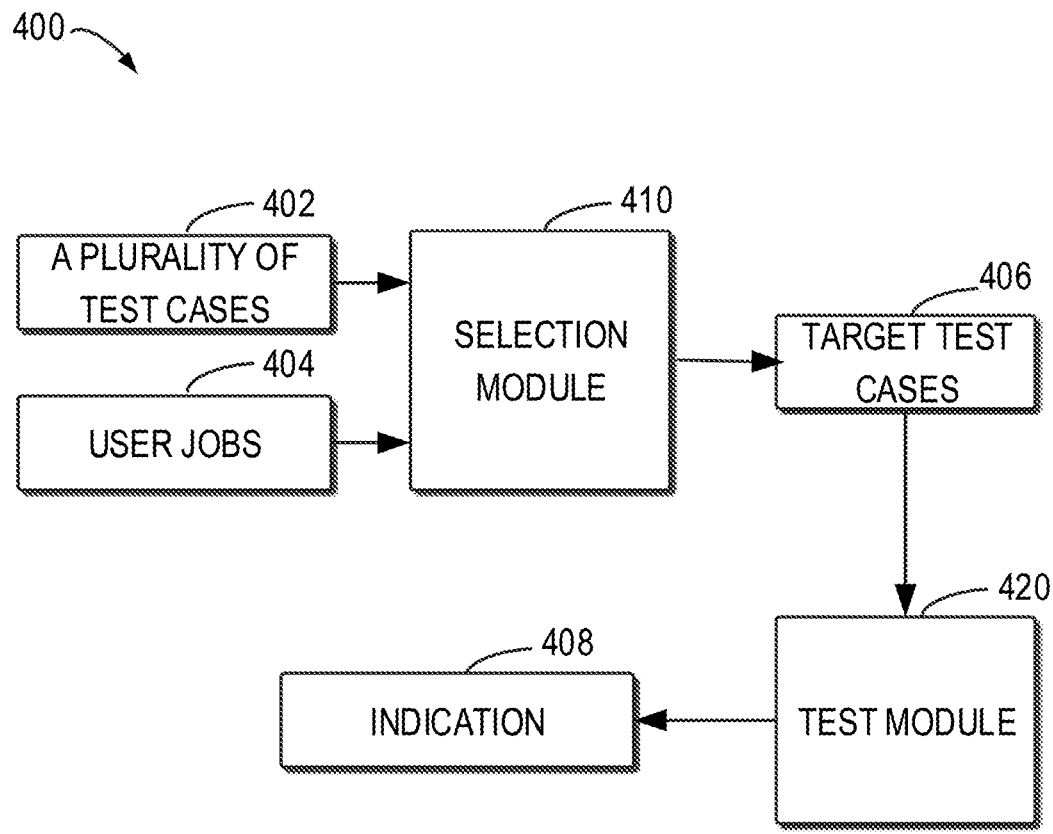
FIG. 4 depicts an example environment for implementing recommendations about migration between software products according to embodiments of the present disclosure.

With reference now to FIG. 4, an example environment 400 in which embodiments of the present disclosure can be implemented is shown. It is to be understood that the elements of the environment 400 are described only for the purpose of illustration without suggesting any limitations as to the scope of the present disclosure. The embodiments of the present disclosure can be embodied with different elements. For example, at least part of or all the environment 400 may be implemented by computer system/server 12 of FIG. 1.

As shown in FIG. 4, the environment 400 may include a selection module 410 and a test module 420. The selection module 410 may select from a plurality of test cases 402 and based on user jobs 404, target test cases 406 used for testing software products. The user jobs 404 may indicate the historic usage of one or more users interacting with a first software product.

The first software product may be any software product specified for a comparison with a second software product (i.e., the target software product). The first software product may be a software product being currently used by the user and the second software product may be a higher version or an upgraded version of the software product. Alternatively, the first software product may be a software product running in a specified operating system and the second software product is running in a different operating system.

The target test cases 406 are selected from the plurality of test cases 402 to test the first software product and the second software product. A test case can be considered as a constructed user job for exercising a particular program path or verifying compliance with a specific requirement.

The plurality of test cases 402 may be obtained from a test suite associated with the first software product and the second software product. For example, the plurality of test cases 402 may be obtained from a test suite previously used in the development of the first software product and the second software product. Additionally, the plurality of test cases 402 may be obtained based on selection and/or construction by software product developers. For example, the developers may select the plurality of test cases 402 based on the user jobs 404.

The test module 420 may apply the selected target test cases 406 to the first software product and the second software product and provide an indication 408 based on a result of applying the target test cases 406. In some embodiments, the indication 408 may be provided to indicate migrating from the first software product to the second software product.

For example, if test outputs of the first software product and the second software product are the same, the test module 420 may provide the user with the indication 408 indicating migrating to the second software product. Alternatively, or in addition, the test module 420 may provide other users with the indication 408 indicating migrating to the second software product. The other users may be grouped with the user associated with the user jobs due to similar usage behavior, user profiles, and/or any suitable rules.

In some embodiments, if different test outputs are obtained from the first software product and the second software product, the test module 420 may provide the user with the indication 408 to indicate that the second software product may not have or support the feature(s) they need and migrating to the second software product is inappropriate.

Alternatively, or in addition, the test module 420 may provide developers of the second software product with the indication 408 to indicate that the second software product needs to be further developed to include the required feature(s). The required feature(s) may be determined based on the target test case that causes different test outputs in the first and second software products.

The selection module 410 and the test module 420 may be implemented by computer system/server 12 of FIG. 1. In some embodiments, the selection module 410 and the test module 420 may be implemented on the user side. For example, a system may be provided on a user device and the system may be authorized to obtain the user jobs 404 from the first software product running on the user device. The system may also be authorized to apply the target test cases 406 to the first software product and the second software product in a testing environment and provide the indication 408 to the user.

In some embodiments, the selection module 410 and the test module 420 may be implemented on the developer side. For example, the selection module 410 may obtain user data assets from the user device to determine the user jobs 404 and select the target test cases 406 based on the user jobs 404. The test module 420 may apply the target test cases 406 to the first and second software products and provide the indication 408 to the user device and/or the developers of the second software product.

Figure 5:
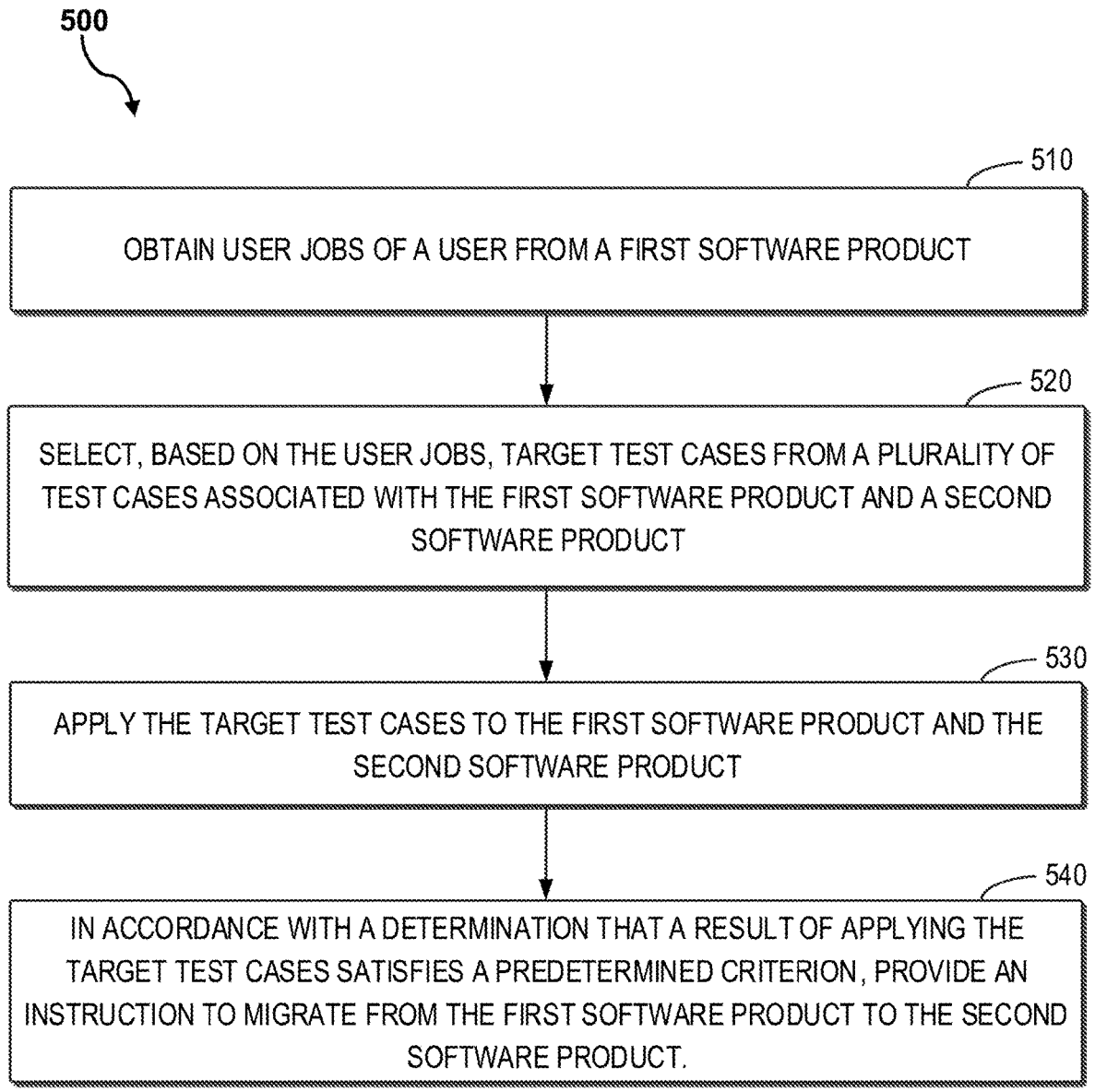
FIG. 5 depicts a flowchart of an example method for providing instruction about migration between software products according to embodiments of the present disclosure.

FIG. 5 depicts a flowchart of an example method 500 for providing instruction about migration between software products according to embodiments of the present disclosure. The method 500 may be implemented in the example environment 400 as shown in FIG. 4 and will be described with reference to FIG. 4. It is to be understood that the method 500 may also comprise additional blocks (not shown) and/or may omit the illustrated blocks. The scope of the present disclosure described herein is not limited to this aspect.

At block 510, the selection module 410 obtains the user jobs 404 of a user from the first software product. As mentioned above, the user jobs 404 may indicate interactions between the user and the first software product and the user may be the one seeking a recommendation of migration between software products. The first software product may be a currently used software product (e.g., an old version of a software product to be upgraded or updated).

At block 520, the selection module 410 selects, based on the user jobs 404, the target test cases 406 from the plurality of test cases 402 associated with the first software product and the second software product. The details of selecting the target test cases 406 may be described with reference to FIGS. 6-9 below.

Figure 6:
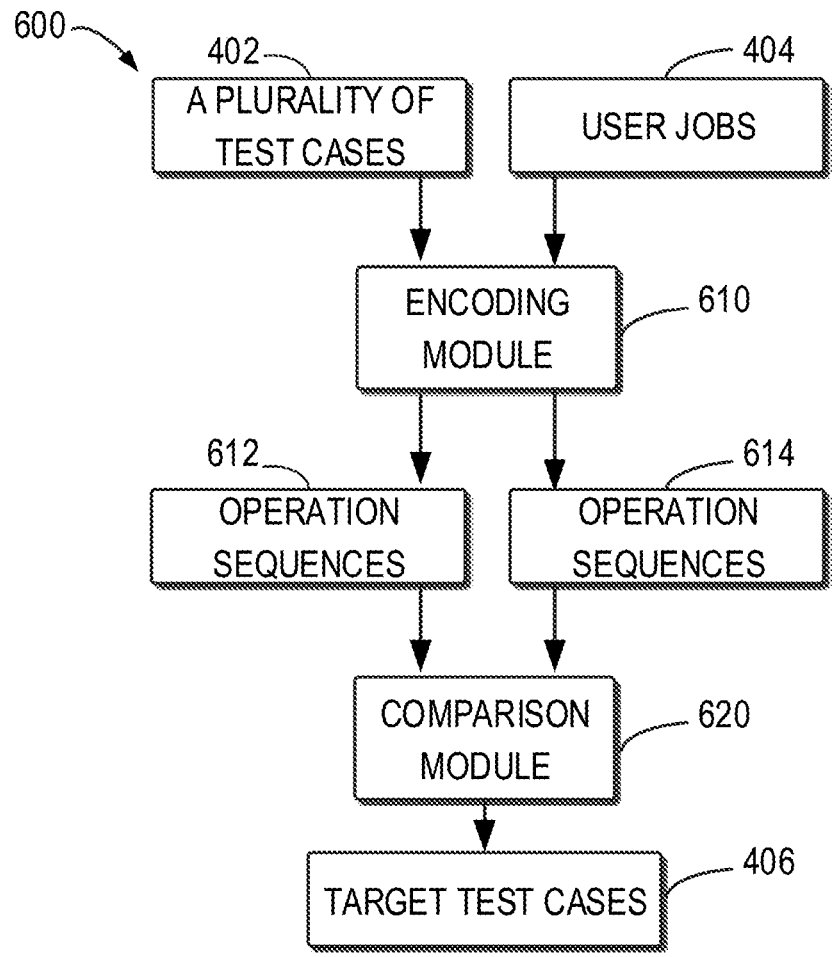
FIG. 6 depicts an example process for selecting target test cases according to embodiments of the present disclosure.

FIG. 6 depicts an example process 600 for selecting the target test cases 406 according to embodiments of the present disclosure. As shown in FIG. 6, an encoding module 610 and a comparison module 620 may be used to select the target test cases 406 based on the user jobs 404.

The encoding module 610 may encode each of the plurality of test cases 402 and the user jobs 404 as a corresponding operation sequence and the operation sequence indicates one or more operations required for the execution of the respective test case or user job. The operation sequence may comprise one or more identifiers of one or more operations and the operations are uniquely identified. For example, each of the operations may be encoded as a respective number.

In some embodiments, the encoding module 610 may determine a first plurality of operation sequences, also referred to as test case operation sequences 612, corresponding to the plurality of test cases 402. Each of the plurality of operation sequences may comprise one or more identifiers of the one or more operations required for executing a respective test case of the plurality of test cases 402.

For example, regarding a test case used for testing a feature of training machine learning models, the determined corresponding operation sequence may comprise identifiers of operations such as reading data, preprocessing the data, training a model, and saving the trained model.

The encoding module 610 may further determine a second plurality of operation sequences, also referred to as user job operation sequences 614, corresponding to the user jobs 404 and each of the second plurality of operation sequences may comprise one or more identifiers of one or more operations required for executing a respective user job of the user jobs 404. Similarly, an example operation sequence may comprise identifiers of operations such as reading data, preprocessing the data, training a model, and saving the trained model.

Based on that, the comparison module 620 may select the target test cases 406 based on differences between the test case operation sequences 612 and the user job operation sequences 614. The comparison module 620 may identify target operation sequences from the test case operation sequences 612 and determine the test cases corresponding to the target operation sequences as the target test cases 406.

In some embodiments, the comparison module 620 may select from the plurality of test cases 402 a test case corresponding to a first operation sequence of the test case operation sequences 612 as one of the target test cases 406, and wherein a difference between the first operation sequence and one of the user job operation sequences 614 is below a predetermined threshold.

In other words, for each of the test case operation sequences 612, the comparison module 620 may determine differences between the respective operation sequence and each of the user job operation sequences 614. The comparison module 620 may identify the respective operation sequence as one of the target operation sequences if one of the differences is below the predetermined threshold.

In this way, by selecting the target test cases 406 based on the differences between the operation sequences, test cases corresponding to potential user jobs may be selected and included in the target test cases 406. The potential user jobs may indicate potential usage of the user in the first software product, i.e., interactions the user is likely to perform with the first software product.

For example, if a user job indicates that the user uses a Sigmoid activation layer in a machine learning task, a test case using a Softmax activation layer instead of the Sigmoid activation layer may be selected and included in the target test cases 406 due to a small difference between the operation sequence comprising the operation of using the Softmax activation layer and the operation sequence comprising the operation of using the Sigmoid activation layer.

In other words, the selected target test cases 406 may correspond to the user jobs 404 and/or the potential user jobs of the user. In this case, with the target test cases 406 being applied for testing, it can be determined whether the second software product has the features that the user used and/or is likely to use in the first software product. As such, this solution allows utilizing the current usage information of the first software product to determine whether the second software product can support the potential usage of the user.

In some embodiments, the comparison module 620 may determine the difference between the first operation sequence of the test case operation sequences 612 and a second operation sequence of the user job operation sequences 614 by determining a modified Levenshtein distance between the first operation sequence and the second operation sequence.

The Levenshtein distance is a string metric for measuring the difference between two sequences in information theory, linguistics, and computer science. For example, the Levenshtein distance between two words is the minimum number of single-character edits (insertions, deletions, or substitutions) required to change one word into the other. The details of determining the difference between the first operation sequence and the second operation sequence based on the modified Levenshtein distance will be described with reference to FIGS. 7-9 below.

Figure 7:
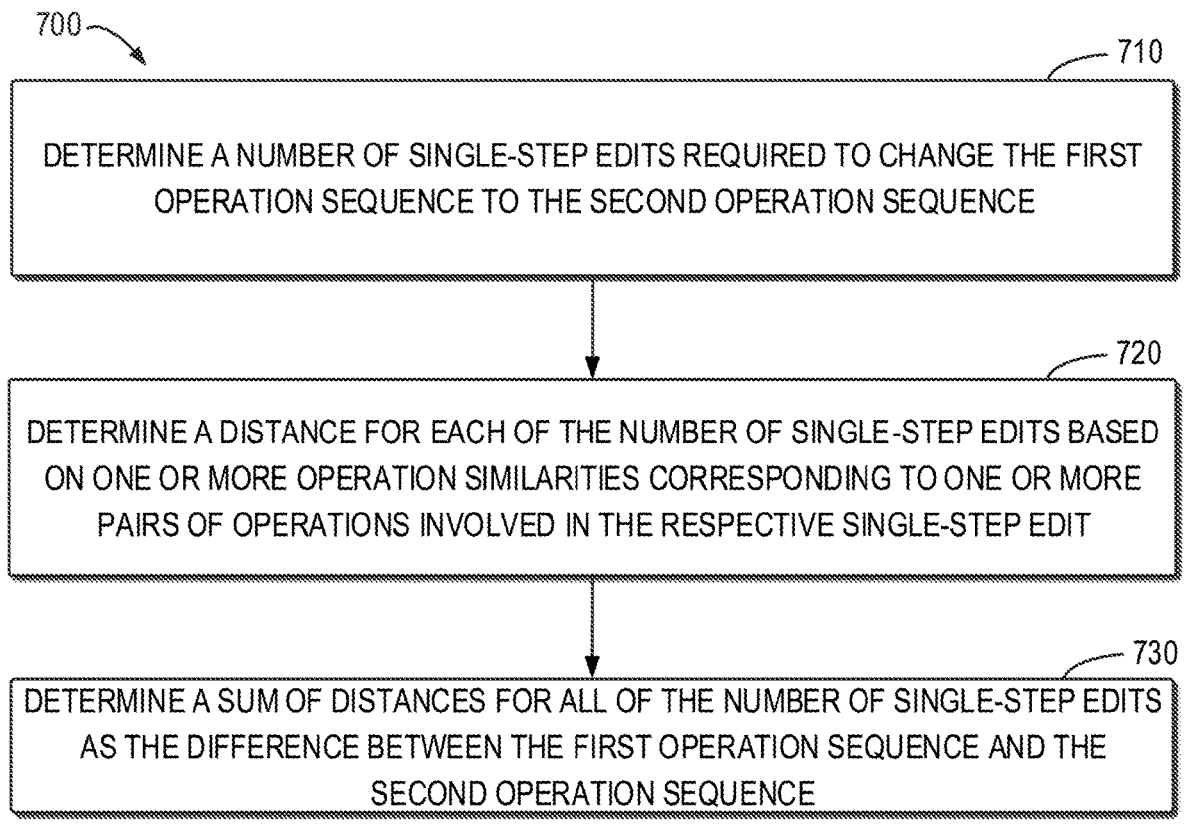
FIG. 7 depicts a flowchart of an example method for determining a difference between a first operation sequence and a second operation sequence according to embodiments of the present disclosure.

FIG. 7 depicts a flowchart of an example method 700 for determining the difference between the first operation sequence and the second operation sequence according to embodiments of the present disclosure. The method 700 may be implemented by the comparison module 620 as shown in FIG. 6.

At block 710, the comparison module 620 may determine a number of single-step edits required to change the first operation sequence to the second operation sequence. The number of required single-step edits may be an integer such as 0, 1, 2, etc.

In some embodiments, the number of single-step edits may comprise an insertion. The insertion may refer to an operation being inserted into the first operation sequence. Alternatively, or in addition, the number of single-step edits may comprise a deletion. The deletion may refer to an operation being deleted from the first operation sequence. Alternatively, or in addition, the number of single-step edits may comprise a substitution. The substitution may refer to an operation in the first operation sequence being replaced by another operation in the second operation sequence.

At block 720, the comparison module 620 may determine a distance for each of the number of single-step edits. In some embodiments, the comparison module 620 may determine the distance depending on the type of the single-step edit. For example, the comparison module 620 may use different algorithms to determine the distance for the insertion and the distance for the substitution.

At block 730, the comparison module 620 may determine a sum of distances for all the number of single-step edits as the difference between the first operation sequence and the second operation sequence. In some embodiments, the comparison module 620 may determine a weighted sum of the distances. For example, different weights may be assigned to the distances for the insertion and substitution.

FIG. 8 depicts an example 800 of a number of single-step edits according to embodiments of the present disclosure. With reference to FIG. 8, the details of determining the distance for each of the number of single-step edits are described below.

As shown in FIG. 8, four single-step edits 811, 812, 813, and 814, collectively referred to as single-step edits 810, are required to change the first operation sequence 820 to the second operation sequence 830 and each of the operations is identified as a respective number.

For example, the first operation sequence 820 comprises an operation identified as 2, also denoted as Op 2, an operation identified as 4, also denoted as Op 4, an operation identified as 3, also denoted as Op 3, an operation identified as 1, also denoted as Op 1, an operation identified as 6, also denoted as Op 6, an operation identified as 8, also denoted as Op 8, an operation identified as 9, also denoted as Op 9, and an operation identified as 11, also denoted as Op 11.

Likewise, the second sequence 830 comprises Op 2, an operation identified as 5, also denoted as Op 5, Op 3, an operation identified as 7, also denoted as Op 7, Op 6, Op 8, and Op 4.

The single-step edit 811 is a substitution of Op 5 for Op 4; the single-step edit 812 is a substitution of Op 7 for Op 1; the single-step edit 813 is a substitution of Op 4 for Op 9; and the single-step edit 814 is a deletion of Op 11.

In some embodiments, the comparison module 620 may determine the distance for each of the single-step edits 810 based on one or more operation similarities corresponding to one or more pairs of operations involved in the respective single-step edit. For each single-step edit, the one or more involved pairs of operations may depend on the type of the single-step edit.

In some embodiments, when a single-step edit is a substitution, a pair of operations involved in the substitution may comprise the first operation in the first operation sequence and a second operation in the second operation sequence that substitutes the first operation.

For example, for the single-step edit 811, the involved pair of operations comprises Op 4 and Op 5. For the single step edit 812, the involved pair of operations comprises Op 1 and Op 7. For the single step edit 813, the involved pair of operations comprises Op 9 and Op 4.

In some embodiments, when a single-step edit is a deletion, one or more pairs of operations may be determined as being involved in the deletion. Each involved pair of operations may comprise the operation to be deleted from the first operation sequence and a respective operation remaining in the first operation sequence.

For example, as shown in FIG. 8, seven pairs of operations may be determined as being involved in the single-step edit 814. The seven pairs of operations are (Op 2, Op 11), (Op 5, Op 11), (Op 3, Op 11), (Op 7, Op 11), (Op 6, Op 11), (Op 8, Op 11) and (Op 4, Op 11).

In some embodiments, when a single-step edit is an insertion, one or more pairs of operations may be determined as being involved in the insertion. Each involved pair of operations may comprise the operation to be inserted into the first operation sequence and a respective operation present in the first operation sequence.

For example, for a single step edit changing [2,5,3,7,6,8,4] to [2,5,3,7,6,8,4,11] (not shown in FIG. 8), seven pairs of operations may be determined as being involved in the insertion. The seven pairs of operations are (Op 2, Op 11), (Op 5, Op 11), (Op 3, Op 11), (Op 7, Op 11), (Op 6, Op 11), (Op 8, Op 11) and (Op 4, Op 11).

In some embodiments, for each pair of operations, the comparison module 620 may determine an operation distance to indicate the operation similarity corresponding to the pair of operations. Alternatively, or in addition, the operation similarity may be specified by predefined values. The farther the operation distance, the lower the operation similarity is. The comparison module 620 may determine a mean of the one or more operation distances of the one or more pairs of operations involved in a single-step edit as the distance for the single-step edit.

For example, the distance for the single-step edit 811 may be determined as the operation distance of (Op 4, Op 5); the distance of the single-step edit 812 may be determined as the operation distance of (Op 1, Op 7); the distance of the single-step edit 813 may be determined as the operation distance of (Op 9, Op 4); and the distance of the single-step edit 814 may be determined as a mean of the operation distances of (Op 2, Op 11), (Op 5, Op 11), (Op 3, Op 11), (Op 7, Op 11), (Op 6, Op 11), (Op 8, Op 11), and (Op 4, Op 11).

In this way, rather than setting a fixed value for all the distances for single-step edits, various distances may be determined based on the operation similarities involved in the single-step edits. Thus, the determined difference between operation sequences may be more accurate than the traditional Levenshtein distance.

In some embodiments, for each pair of operations, the comparison module 620 may determine the corresponding operation distance based on the attributes of the pair of operations. The attributes of an operation may comprise the category of the operation. The category may be determined based on any suitable rules. For example, operations used in a machine learning task may be classified into categories such as data reading, record generation, column generation, regression model, classification model, data view, etc.

Alternatively, or in addition, the attributes of an operation may comprise input of the operation. The input of the operation may indicate one or more input elements of the operation. For example, when the operation is training a regression model, examples of the input element may comprise model selection method, target distribution, etc.

Alternatively, or in addition, the attributes of an operation may comprise the output of the operation. The output of the operation may indicate output elements of the operation. For example, when the operation is training a regression model, examples of the output element may comprise model evaluation statistics such as Akaike's Information Criteria (AIC), Bayesian Information Criteria (BIC), mean square errors (MSE), resource usage, etc.

In some embodiments, the comparison module 620 may determine a predefined value as the operation distance of the pair of operations if the categories of the pair of operations are different. For example, if the categories of Op 7 and Op 1 are different, the operation distance of (Op 7, Op1) may be determined as 1.

In some embodiments, if the categories of the pair of operations are the same, the comparison module 620 may determine the operation distance of the pair of operations based on the input and output of the pair operations. Moreover, the operation distance of the pair of operations with the same category may be determined as being shorter than the predefined value mentioned above.

In this way, operations with the same category may be described with a higher operation similarity than operations with different categories and thus the distance between the first and second operation sequence can be determined more accurately.

FIG. 9 depicts an example 900 of input and output of operations according to embodiments of the present disclosure. With reference to FIG. 9, the details of determining the operation distance based on the input and output are described below.

In some embodiments, the comparison module 620 may determine the operation distance of the pair of operations based on an input distance and an output distance of the pair of operations. Supposing the pair of operations comprises a first operation and a second operation, the input distance indicates the similarity between the input of the first operation, also referred to as the first input, and the input of the second operation, also referred to as the second input). The output distance indicates the similarity between the output of the first operation, also referred to as the first output, and the output of the second operation, also referred to as the second output.

In some embodiments, the comparison module 620 may determine a weighted sum of the input distance and the output distance as the operation distance. For example, the operation distance may be determined as follows.

$$OperationDistance = \frac{1}{2}(InputDistance + OutputDistance) \quad (1)$$

wherein the OperationDistance denotes the operation distance of the pair of operations and the InputDistance and the OutputDistance denote the input distance and the output distance respectively.

In some embodiments, the input distance and the output distance may be normalized to an interval of [0, 1], and the predefined value may be determined as 1. In this case, the operation distance of a pair of operations with the same category would be no farther than the operation distance of a pair of operations with different categories.

In some embodiments, the comparison module 620 may determine the input distance and the output distance as follows.

$$Distance_{(i,j)} = 1 - \frac{1}{2} \left( \frac{\text{Number of overlapped elements}}{\text{Number of elements in } Op\ i} + \frac{\text{Number of overlapped elements}}{\text{Number of elements in } Op\ j} \right) \quad (2)$$

wherein the $Distance_{(i,j)}$ denotes the input distance or the output distance between Op i and Op j.

As shown in Equation (2), the comparison module 620 may determine the input distance between Op i and Op j based on the number of elements in the input of Op i, the number of elements in the input of Op j, and the number of overlapped elements in the inputs of Op i and Op j.

Similarly, the comparison module 620 may determine the output distance between Op i and Op i based on the number of elements in the output Op i, the number of elements in the output Op j, and the number of overlapped elements in the outputs of Op i and Op j.

For example, as shown in FIG. 9, if the categories of Op 1 and Op 2 are the same, the input elements of Op 1 are {A, B, C} and the input elements of Op 2 are {A, B, C, D, E}, then the input distance may be calculated as $$1 - \frac{1}{2}\left(\frac{3}{3} + \frac{3}{5}\right) = 0.200.$$

Likewise, if the categories of Op 1 and Op 2 are the same, the output elements of Op 1 are {C, D, E, F} and the output elements of Op 2 are {D, E, H}, then the output distance may be calculated as $$1 - \frac{1}{2}\left(\frac{2}{4} + \frac{2}{3}\right) = 0.417.$$

In this way, with the attributes of operations considered, the operation distances, i.e., operation similarities may be determined more accurately. Thus, the determined difference between two operation sequences may be more accurate than the traditional Levenshtein distance.

As mentioned above, based on the differences between the test case operation sequences 612 and the user job operation sequences 614, the comparison module 620 may identify target operation sequences from the test case operation sequences 612 and determine the test cases corresponding to the target operation sequences as the target test cases 406.

Referring back to FIG. 5, at block 530, the test module 410 applies the target test cases 406 to the first software product and the second software product. In other words, the test module 410 runs the target test cases 406 in the first and second software products.

At block 540, in accordance with a determination that a result of applying the target test cases 406 satisfies a predetermined criterion, the test module 410 provides the indication 408 to indicate migrating from the first software product to the second software product. The predetermined criterion may be associated with the test outputs of the target test cases 406. For example, the predetermined criterion may define that 95% of the test outputs are the same.

In some embodiments, in accordance with a determination that a result of applying the target test cases 406 does not satisfy the predetermined criterion, the test module 410 provides the indication 408 to indicate further development of the second software product. The indication 408 may be provided to the developers to instruct the developers to include the required features.

It can be seen that embodiments of the present disclosure provide a solution for providing recommendations about migration between software products. By applying the target test cases associated with the user jobs, this solution allows for determining a user-specific feature gap between the software products and thus the user can be instructed whether to migrate to the target software product based on his/her own usage behavior. Therefore, the accuracy of recommendations may be increased, and the user experience may be improved.

Moreover, by encoding the plurality of test cases and user jobs as operation sequences and selecting the target test cases based on the differences between the operation sequences, test cases corresponding to the potential user jobs may be selected and included in the target test cases. In this way, this solution allows utilizing usage information of the first software product to determine whether the second software product has the features that the user has used and/or is likely to use in the first software product. As such, the recommendation about whether to migrate to the second software product may be determined more accurately.

In addition, this solution allows the user to be instructed based on the result of applying the target test cases and the users may not need to read the detailed documents of the software products. As such, the user experience can be improved.

The present disclosure may be a system, a method, and/or a computer program product at any possible technical detail level of integration. The computer program product may include a computer readable storage medium, or media, having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining, by one or more processors, user jobs of a user from a first software product;
selecting, by the one or more processors and based on the user jobs, one or more target test cases from a plurality of test cases associated with the first software product and a second software product;
applying, by the one or more processors, the one or more target test cases to the first software product and the second software product; and
in accordance with a determination that a result of applying the one or more target test cases satisfies a predetermined criterion, providing, by the one or more processors, an instruction to migrate from the first software product to the second software product.

2. The method of claim 1, wherein selecting the one or more target test cases comprises:
determining, by the one or more processors, a first plurality of operation sequences corresponding to the plurality of test cases and a second plurality of operation sequences corresponding to the user jobs, wherein each operation sequence of the first plurality of operation sequences and the second plurality of operation sequences comprises one or more identifiers of one or more operations for executing a user job or a test case; and selecting, by the one or more processors, the one or more target test cases based on differences between the first plurality of operation sequences and the second plurality of operation sequences.

3. The method of claim 2, wherein selecting the one or more target test cases based on the differences between the first plurality of operation sequences and the second plurality of operation sequences comprises:
selecting, by the one or more processors and from the plurality of test cases, the test case corresponding to a first operation sequence of the first plurality of operation sequences as one of the one or more target test cases, a difference between the first operation sequence and one of the second plurality of operation sequences being below a predetermined threshold.

4. The method of claim 3, wherein selecting the test case corresponding to the first operation sequence of the first plurality of operation sequences as the one of the one or more target test cases comprises determining the difference between the first operation sequence and a second operation sequence of the second plurality of operation sequences by:
determining, by the one or more processors, a number of single-step edits required to change the first operation sequence to the second operation sequence;
determining, by the one or more processors, a distance for each of the number of single-step edits based on one or more operation similarities corresponding to one or more pairs of operations involved in a respective single-step edit; and
determining, by the one or more processors, a sum of distances for all of the number of single-step edits as the difference between the first operation sequence and the second operation sequence.

5. The method of claim 4, wherein the number of single-step edits comprise at least one of an insertion, deletion, or substitution, and wherein the one or more pairs of operations involved in the respective single-step edit comprises:
the pair of operations comprising a first operation in the first operation sequence and a second operation in the second operation sequence that substitutes the first operation;
the pair of operations comprising a third operation to be deleted from the first operation sequence and an operation remaining in the first operation sequence; or
the pair of operations comprising a fourth operation to be inserted into the first operation sequence and an operation present in the first operation sequence.

6. The method of claim 4, wherein determining the difference between the first operation sequence and the second operation sequence further comprises:
determining, by the one or more processors, one or more operation pair similarities corresponding to the one or more pairs of operations based on attributes of the one or more pairs of operations involved in the respective single-step edit.

7. The method of claim 6, wherein the attributes comprise a category, an input, or an output of a pair of operations, and wherein determining the one or more operation pair similarities comprises determining an operation distance of the one or more pairs of operations to indicate each of the one or more operation similarities by:
in accordance with a determination that categories of the pair of operations are the same, determining, by the one or more processors, the operation distance based on the input and the output of the pair of operations; and in accordance with a determination that the categories of the pair of operations are different, determining, by the one or more processors, a predefined value as the operation distance.

8. The method of claim 7, wherein the pair of operations comprises a fifth operation and a sixth operation, and wherein determining the operation distance based on the input and the output of the pair of operations comprises:

determining, by the one or more processors, the operation distance based on an input distance between a first input of the fifth operation and a second input of the sixth operation and an output distance between a first output of the fifth operation and a second output of the sixth operation.

9. The method of claim 8, wherein determining the operation distance further comprises:

determining, by the one or more processors, the input distance based on a number of elements in the first input, a number of elements in the second input, and a number of overlapped elements in the first input and the second input; and determining, by the one or more processors, the output distance based on a number of elements in the first output, a number of elements in the second output, and a number of overlapped elements in the first output and the second output.

10. The method of claim 1, further comprising:

in accordance with a determination that the result of applying the one or more target test cases does not satisfy the predetermined criterion, providing, by the one or more processors, the instruction to further develop the second software product.

11. A system comprising:

a processing unit; and a memory coupled to the processing unit and storing instructions thereon, the instructions, when executed by the processing unit, performing actions comprising:

obtaining user jobs of a user from a first software product;

selecting, based on the user jobs, one or more target test cases from a plurality of test cases associated with the first software product and a second software product;

applying the one or more target test cases to the first software product and the second software product; and in accordance with a determination that a result of applying the one or more target test cases satisfies a predetermined criterion, providing an instruction to migrate from the first software product to the second software product.

12. The system of claim 11, wherein selecting the one or more target test cases comprises:

determining a first plurality of operation sequences corresponding to the plurality of test cases and a second plurality of operation sequences corresponding to the user jobs, wherein each operation sequence of the first plurality of operation sequences and the second plurality of operation sequences comprises one or more identifiers of one or more operations for executing a user job or a test case; and selecting the one or more target test cases based on differences between the first plurality of operation sequences and the second plurality of operation sequences.

13. The system of claim 12, wherein selecting the one or more target test cases based on the differences between the first plurality of operation sequences and the second plurality of operation sequences comprises:

selecting, from the plurality of test cases, the test case corresponding to a first operation sequence of the first plurality of operation sequences as one of the one or more target test cases, a difference between the first operation sequence and one of the second plurality of operation sequences being below a predetermined threshold.

14. The system of claim 13, wherein selecting the test case corresponding to the first operation sequence of the first plurality of operation sequences as the one of the one or more target test cases comprises determining the difference between the first operation sequence and a second operation sequence of the second plurality of operation sequences by:

determining a number of single-step edits required to change the first operation sequence to the second operation sequence;

determining a distance for each of the number of single-step edits based on one or more operation similarities corresponding to one or more pairs of operations involved in a respective single-step edit; and determining a sum of distances for all of the number of single-step edits as the difference between the first operation sequence and the second operation sequence.

15. The system of claim 14, wherein determining the difference between the first operation sequence and the second operation sequence further comprises:

determining the one or more operation similarities corresponding to the one or more pairs of operations based on attributes of the one or more pairs of operations involved in the respective single-step edit.

16. The system of claim 15, wherein the attributes comprise a category, an input, or an output of a pair of operations, and wherein determining the one or more operation similarities comprises determining an operation distance of the one or more pairs of operations to indicate each of the one or more operation similarities by:

in accordance with a determination that categories of the pair of operations are the same, determining the operation distance based on the input and the output of the pair of operations; and in accordance with a determination that the categories of the pair of operations are different, determining a predefined value as the operation distance.

17. A computer program product being tangibly stored on a non-transient machine-readable medium and comprising machine-executable instructions, the instructions, when executed on a device, causing the device to perform actions comprising:

obtaining user jobs of a user from a first software product;

selecting, based on the user jobs, one or more target test cases from a plurality of test cases associated with the first software product and a second software product;

applying the one or more target test cases to the first software product and the second software product; and in accordance with a determination that a result of applying the one or more target test cases satisfies a predetermined criterion, providing an instruction to migrate from the first software product to the second software product.

18. The computer program product of claim 17, wherein selecting the one or more target test cases comprises:

determining a first plurality of operation sequences corresponding to the plurality of test cases and a second plurality of operation sequences corresponding to the user jobs, wherein each operation sequence of the first plurality of operation sequences and the second plurality of operation sequences comprises one or more identifiers of one or more operations for executing a user job or a test case; and selecting the one or more target test cases based on differences between the first plurality of operation sequences and the second plurality of operation sequences.

19. The computer program product of claim 18, wherein selecting the one or more target test cases based on the differences between the first plurality of operation sequences and the second plurality of operation sequences comprises:

selecting, from the plurality of test cases, the test case corresponding to the first operation sequence of the first plurality of operation sequences as one of the one or more target test cases, a difference between the first operation sequence and one of the second plurality of operation sequences being below a predetermined threshold.

20. The computer program product of claim 19, wherein selecting the test case corresponding to a first operation sequence of the first plurality of operation sequences as the one of the one or more target test cases comprises determining the difference between the first operation sequence and a second operation sequence of the second plurality of operation sequences by:

determining a number of single-step edits required to change the first operation sequence to the second operation sequence;

determining a distance for each of the number of single-step edits based on one or more operation similarities corresponding to one or more pairs of operations involved in a respective single-step edit; and determining a sum of distances for all of the number of single-step edits as the difference between the first operation sequence and the second operation sequence.

* * * * *